US007360711B2

(12) United States Patent
Jung et al.

(10) Patent No.: US 7,360,711 B2
(45) Date of Patent: Apr. 22, 2008

(54) APPARATUS AND METHOD OF IDENTIFYING A SIM CARD OWNER

(75) Inventors: Yong Hwan Jung, Kwanglu (KR); Sun Tae Jo, Kyungki-Do (KR); Tae Gyun Kim, Suwon (KR)

(73) Assignee: LG Electronics Inc., Seoul (KR)

( * ) Notice: Subject to any disclaimer, the term of this patent is extended or adjusted under 35 U.S.C. 154(b) by 701 days.

(21) Appl. No.: 10/137,303

(22) Filed: May 3, 2002

(65) Prior Publication Data
US 2002/0185530 A1 Dec. 12, 2002

(30) Foreign Application Priority Data
May 4, 2001 (KR) ............................... 2001-24437
May 4, 2001 (KR) ............................... 2001-24438

(51) Int. Cl.
*G06K 19/06* (2006.01)
(52) U.S. Cl. ................. 235/492; 234/472.01; 234/380; 455/566; 455/572
(58) Field of Classification Search .......... 235/472.01, 235/472.02, 486, 380, 382, 492; 455/572, 455/566, 558
See application file for complete search history.

(56) References Cited
U.S. PATENT DOCUMENTS
5,867,795 A * 2/1999 Novis et al. ................ 455/566
(Continued)
FOREIGN PATENT DOCUMENTS
CN 1191358 A 8/1998

EP 0831629 A2 3/1998
(Continued)

OTHER PUBLICATIONS
P. Maes, "Subscriber Identity Module for Pan-European Mobile Telephone Network," Smart Card Technology, vol. 2, 1990, p. 1-13.

*Primary Examiner*—Steven S. Paik
(74) *Attorney, Agent, or Firm*—Ked & Associates, LLP

(57) ABSTRACT

A communications terminal that utilizes a SIM card is configured to allow a user to easily identify the owner of a SIM card. In one embodiment of the invention, owner identification data is stored on the SIM card, and when power is first applied to the communications terminal, the owner identification data is read from the SIM card and played by the communications terminal. In some embodiments, this could include reading an image of the owner from the SIM card and displaying the image on a display screen of the communications terminal. In other embodiments, this could include reading audio data from the SIM card and playing the audio data over a speaker of the communications terminal. In yet other embodiments of the invention, owner identifying data can be attached to a SIM card, and the SIM card is then inserted into a receiving slot of a communications terminal. The communications terminal would be designed to include a transparent window adjacent the SIM card receiving slot such that the owner identifying data on the SIM card can be viewed through the transparent window. In still other embodiments of the invention, a SIM card holder is attached to a SIM card, and the holder includes a transparent window. The SIM card holder is designed such that indicia on the SIM card, or a label applied to the SIM card, is viewable through the transparent window.

25 Claims, 5 Drawing Sheets

U.S. PATENT DOCUMENTS

| | | | | |
|---|---|---|---|---|
| 5,979,771 A | * | 11/1999 | Adams et al. | 235/486 |
| 6,047,198 A | * | 4/2000 | Sudo | 455/566 |
| 6,112,996 A | * | 9/2000 | Matsuo | 235/492 |
| 6,199,158 B1 | * | 3/2001 | Hirsch | 713/1 |
| 6,292,561 B1 | * | 9/2001 | Benson | 379/433.13 |
| 6,381,477 B1 | * | 4/2002 | Johnson et al. | 455/572 |
| 6,400,965 B1 | * | 6/2002 | Phillips et al. | 455/558 |
| 6,461,193 B1 | * | 10/2002 | Matthies | 439/509 |
| 6,504,932 B1 | * | 1/2003 | Vasnier et al. | 380/273 |
| 6,594,154 B1 | * | 7/2003 | Brewer et al. | 361/801 |
| 6,612,498 B1 | * | 9/2003 | Lipponen et al. | 235/486 |
| 6,738,047 B2 | * | 5/2004 | Kobayashi | 345/172 |
| 2002/0045465 A1 | * | 4/2002 | Kishida et al. | 455/566 |
| 2002/0169958 A1 | * | 11/2002 | Nyman et al. | 713/168 |

FOREIGN PATENT DOCUMENTS

| | | | |
|---|---|---|---|
| EP | 1199868 A1 | * | 4/2002 |
| GB | 19902806 | | 8/2000 |
| JP | 411331334 A | * | 11/1999 |
| JP | 411331334 A | * | 11/1999 |
| JP | 11331334 | | 2/2000 |
| WO | WO 99/64976 | | 12/1999 |
| WO | WO 0033562 | * | 6/2000 |
| WO | WO 01/15413 A1 | | 3/2001 |

* cited by examiner

APPARATUS AND METHOD OF IDENTIFYING A SIM CARD OWNER

BACKGROUND OF THE INVENTION

1. Field of the Invention

The present invention relates to a GSM terminal, and more particularly, to an apparatus and method for identifying a SIM (Subscriber Identify Module) card owner in a GSM terminal.

2. Background of the Related Art

Generally, a Global System for Mobile communication (GSM) terminal using a time division multiple connection method uses Subscriber Identity Module (SIM) cards. The SIM card is a removable smart card comprised of a microprocessor and a memory chip. In the memory chip, personal information of a SIM card owner and other information, including (phone numbers and network numbers) are stored. In addition, personal certification information such as a Personal Identification Number (PIN) and a Personal Unblocking Key (PUK) of the SIM card owner are stored.

Personal certification information stored in the memory chip enables verification of the SIM card owner by determining whether the SIM card owner is registered for the network when the SIM card is inserted into the mobile communication terminal. Typically, after inserting the SIM card in the GSM terminal, the user inputs his or her PIN. Then, the microprocessor determines whether the SIM card owner is a registered user by comparing the PIN entered by the user with the PIN stored in the memory chip. If the two PINs match, the microprocessor permits the user access to the GSM terminal. If the two PINs are different, the microprocessor blocks the use of the terminal. If the user fails to enter the correct PIN in three attempts, the user must then enter the PUK in order to release the blocking of the terminal.

In the prior art systems, there was no way to verify the SIM card owner other than by inserting SIM into a GSM terminal, turning on the terminal power and entering the PIN. Moreover, it has been virtually impossible to identify one's own SIM card with the naked eye because all SIM cards are basically identical in appearance.

SUMMARY OF THE INVENTION

An object of the invention is to solve at least the above problems and/or disadvantages and to provide at least the advantages described hereinafter.

One objective of the present invention is to provide an apparatus and method for visually verifying a SIM card owner in a GSM terminal.

Another objective of the present invention is to provide a mobile telephone designed to allow visual verification of SIM card ownership once a visually verifiable SIM card is inserted into the mobile telephone.

To achieve these and other advantages and in accordance with the purpose of the present invention, as embodied and broadly described herein, in an apparatus embodying the invention, image data of a user is stored in a SIM card, and a terminal that uses the SIM card is configured to read the image data of the user from the SIM card and to display the image data when power is first applied to the terminal.

Here, the SIM card is composed of a memory chip and a microprocessor and the memory chip is comprised of: (1) a personal certification storage unit where personal certification information is stored; (2) a registration data storage unit where data related to base station registration is stored; and (3) an owner identification data storage unit where data related to a SIM card owner is stored.

A method embodying the invention can include the steps of storing owner identification data in a SIM card, positioning the SIM card in a terminal, displaying a selection message asking whether to display the owner identification data when power is first applied to the terminal, and displaying the owner identification data according to the user's response to the selection message.

In other embodiments of the invention, the SIM card has a user verification means. A SIM card insertion slot is positioned in the body of a terminal, and a SIM card checking unit is positioned in the body of a terminal. The SIM card checking unit is designed to allow a user to see the user verification means on the SIM card, even after the SIM card has been mounted in the terminal.

A SIM card embodying the invention has a microprocessor and a memory chip built therein, and a visual verification means on at least one of the sides of the SIM card.

BRIEF DESCRIPTION OF THE DRAWINGS

The invention will be described in detail with reference to the following drawings, in which like reference numerals refer to like elements, and wherein.

DETAILED DESCRIPTION OF PREFERRED EMBODIMENTS

Reference will now be made in detail to preferred embodiments of the present invention, examples of which are illustrated in the accompanying drawings.

Figure 1:
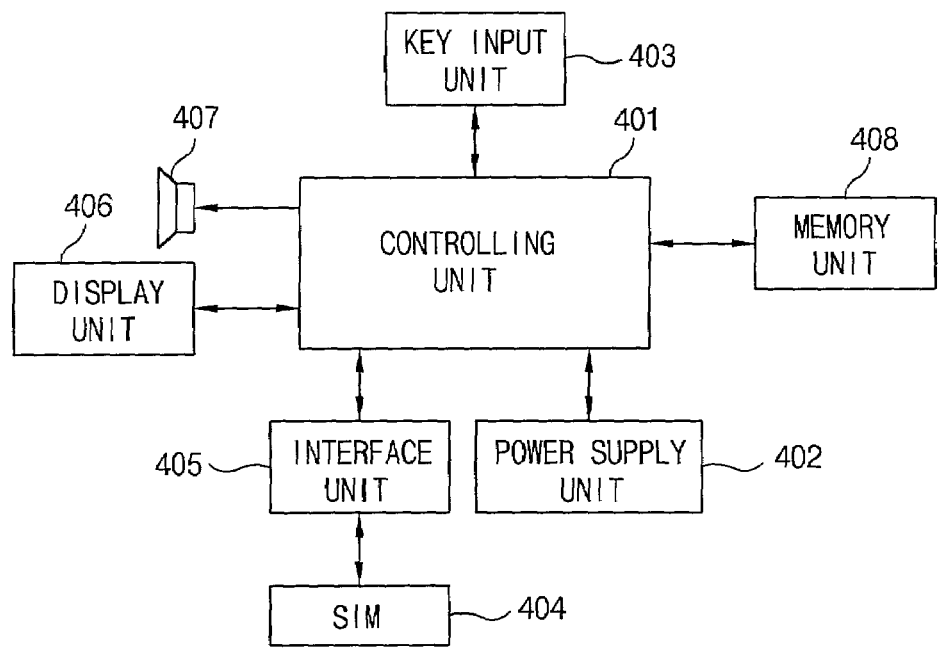
FIG. 1 is a block diagram showing a first embodiment of an apparatus for verifying a SIM card owner in a GSM terminal in accordance with the present invention.

As shown in FIG. 1, an apparatus for verifying a SIM card owner in a GSM terminal includes a controlling unit 401 for controlling the system and processing signals, a power supply unit 402 for supplying power to the terminal, a key input unit 403 for inputting key data, an interface unit 405 for interfacing the SIM card with the controlling unit 401, a display unit 406 for displaying image data of the user stored in the SIM card 404, a speaker 407 for outputting audio data, and a memory unit 408 for storing image or audio data transmitted through the interface unit 405 or wireless data transmitted from or to the terminal.

Figure 2:
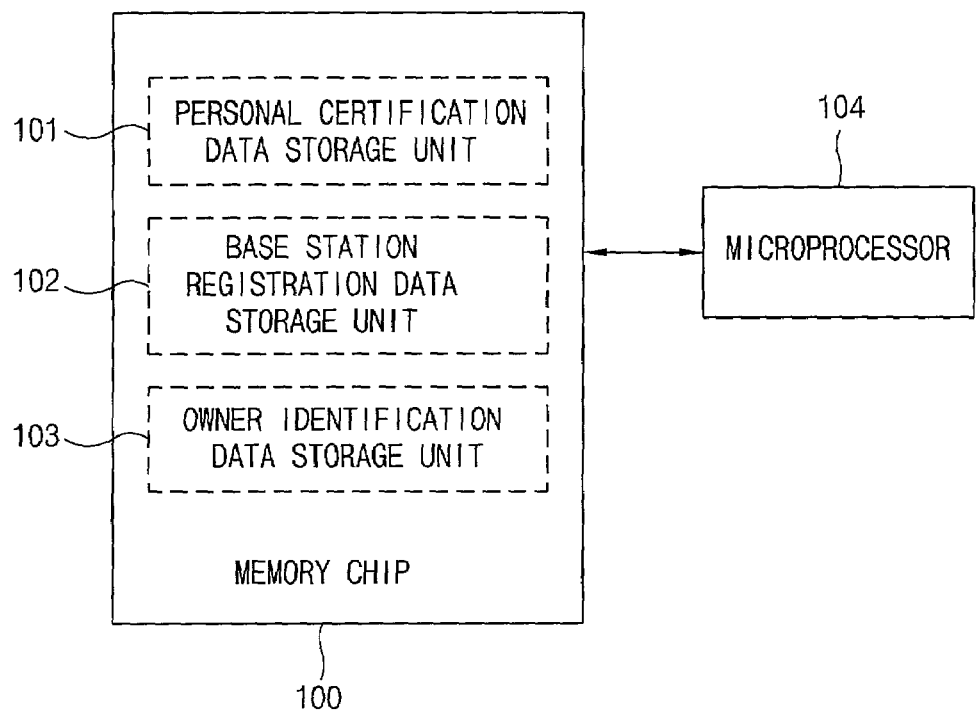
FIG. 2 is a block diagram of a SIM card embodying the invention.

As shown in FIG. 2, the SIM card 404 includes a memory chip 100 and a microprocessor 104. The memory chip 100 includes a personal certification data storage unit 101 where a PIN is stored, a registration data storage unit 102 where data related to base station registration is stored, and an owner identification data storage unit 103 where image data (photographs, animations and characters) and/or audio data related to a SIM card owner is stored.

Figure 3:
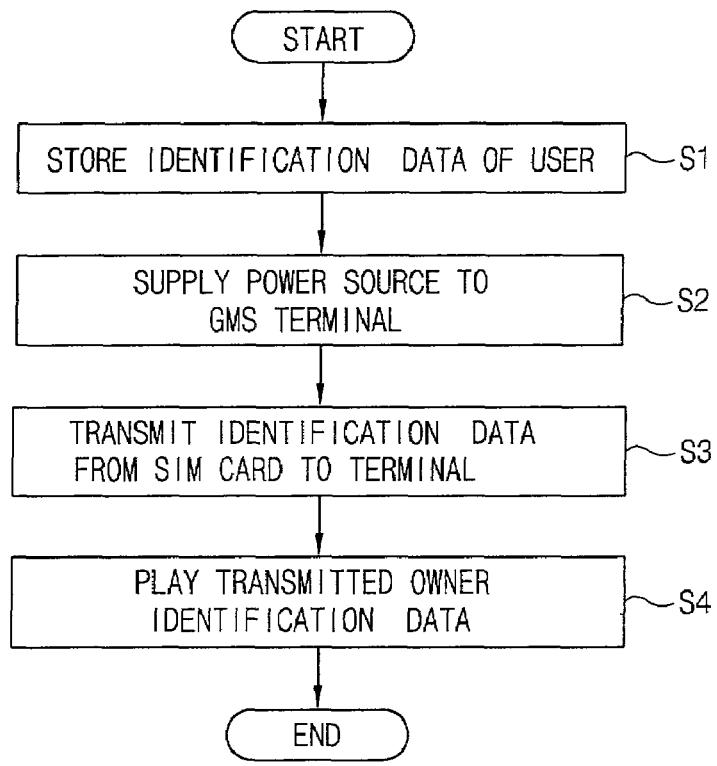
FIG. 3 is a flow chart showing a method embodying the invention for verifying a SIM card owner.

The operation of an apparatus for verifying the SIM card owner in the GSM terminal in accordance with the present invention will be described with reference to FIG. 3. As shown in FIG. 3, the SIM card owner stores verifiable image and/or audio data in the memory chip 100 of the SIM card 404 (S1). The SIM card owner can store owner identification data in the owner identification data storage unit 103 of a SIM card through data transmitted from a base station. Alternatively, the user could download image and/or audio data to the SIM card using a Personal Computer that interfaces with the SIM card. In still other embodiments of the invention, image and/or audio data can be transmitted to a communications terminal holding the SIM card using a wireless Internet connection.

When the power of the key input unit 403 is turned on after positioning the SIM card 404 in the GSM terminal, the power supply unit 402 supplies a power to each device of the GSM terminal (S2). When the power is supplied, the microprocessor 104 of the SIM card 404 reads data from the owner identification data storage unit 103 and transmits the data to the controlling unit 401 through the interface unit 405 (S3). If the data stored on the data storage unit 103 is image data, the controlling unit 401 converts the data into a displayable form and outputs the data to the display unit 406, the image is displayed (S4). Alternatively, if the data retrieved from the data storage unit includes audio data, the controlling unit would convert the data into a playable form, and the audio data would then be played over the speaker 407 of the terminal.

Figure 4:
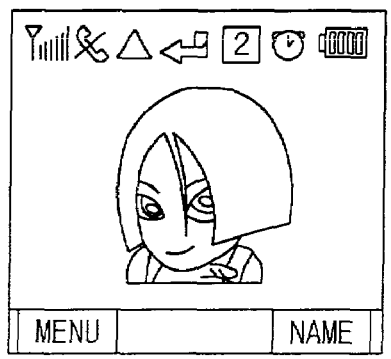
FIG. 4 is a view illustrating an example of image data of a user displayed on a display unit of a terminal.

FIG. 4 shows a display unit 406 of a terminal which is displaying image data. Because the image data (photographs) of the SIM card owner are displayed on the LCD screen of the display unit, a user can visually verify the ownership of the SIM card. Then, the conventional verification method of entering a PIN is performed. With the present invention, when power is first applied to the GSM terminal, the user can easily determine the card owner through the automatic display of the owner's image data which has been stored in the SIM card.

In some embodiments of the invention, the mobile communications terminal can be configured to automatically display the image data upon application of power to the terminal. In other embodiments of the invention, when power is applied to the terminal, the terminal may give the user the option of skipping the display of image data. More specifically, when the power is first applied, the controlling unit 401 may prompt the user to select whether to have the image data displayed on the display screen of the display unit 406, or to skip the display. If the user asks to have the image data displayed, the controlling unit 401 displays the image data received from the owner identification data storage unit 103 on the display screen of the display unit 406.

As mentioned above, audio data, such as voice data of the SIM card owner, can also be stored with image data in the SIM card. The terminal can then output the voice data of the SIM card owner through a speaker 407 when the image data is displayed. Thus the verification of the SIM card owner is performed more effectively. Also, in some embodiments, only audio data is recorded in the SIM card and played upon application of power.

Figure 5:
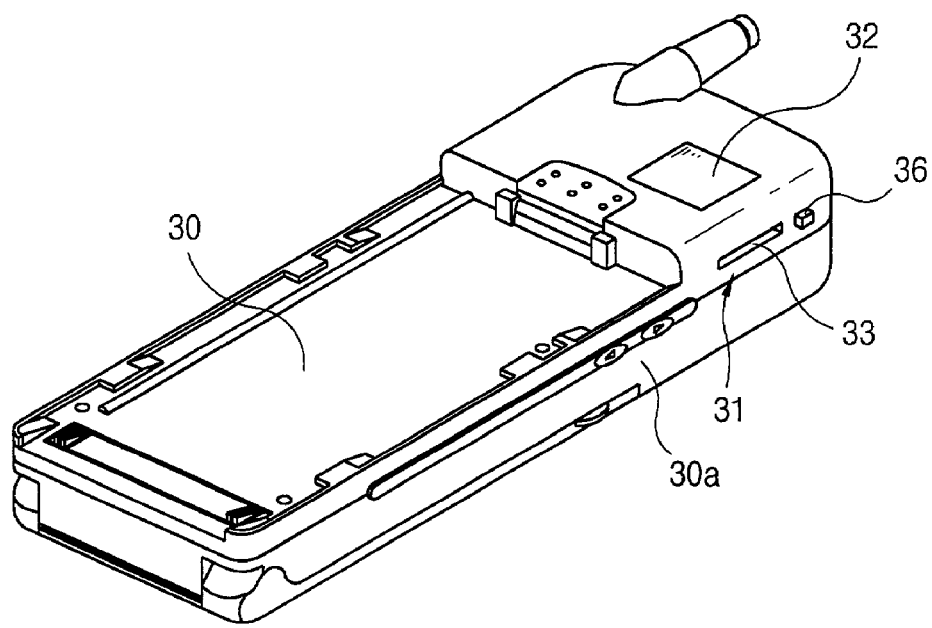
FIG. 5 is a perspective view of a mobile communications terminal embodying the present invention.
Figure 6:
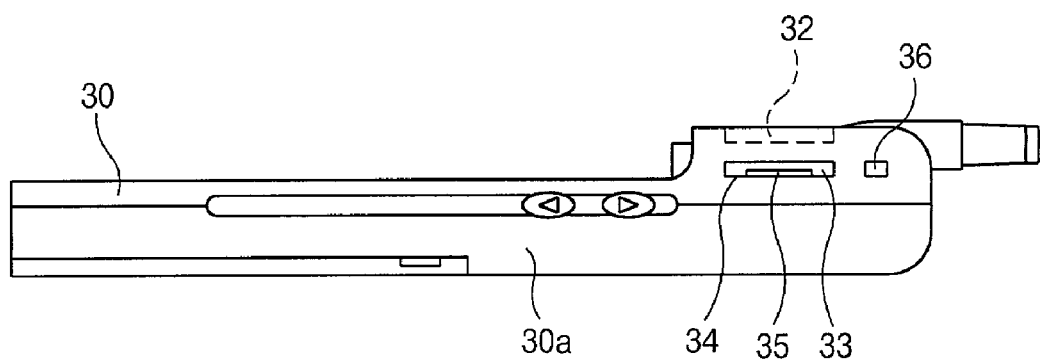
FIG. 6 is a side view of the mobile communications terminal of FIG. 5.

FIG. 5 is a plan view showing another embodiment of the invention which allows a user to easily verify the SIM card owner. As shown in FIG. 5, in this embodiment, the communications terminal includes a SIM card receiving unit 31 positioned at one side surface 30A of the communications terminal 30. The terminal 30 includes a SIM card verifying unit 32 for verifying the SIM card inserted in the insertion slot 33 with the naked eye. As shown in FIG. 6, a connector 35 designed to interface with a SIM card is located on the lower surface 34 of the insertion slot 33. A discharge button 36 for discharging a SIM card inserted in the SIM card receiving unit 31 is formed near the insertion slot 33.

The SIM card verifying unit 32 has a transparent window and the transparent window is positioned so that one of the sides of the SIM card inserted in the SIM card receiving unit 31 can be visually verifiable by the user. This transparent window is positioned on either the front or rear surface of the terminal body 30.

Another method of verifying the SIM card owner does not require positioning the SIM card in a communications terminal. In other words, the ownership of a SIM card can be visually verified by marking at least one side of the SIM card with some type of personal indicia, such as the owner's name. When the SIM card itself is marked with personal identifying information, the SIM card owner can be easily visually verified without positioning the card in a communications terminal.

Figure 7:
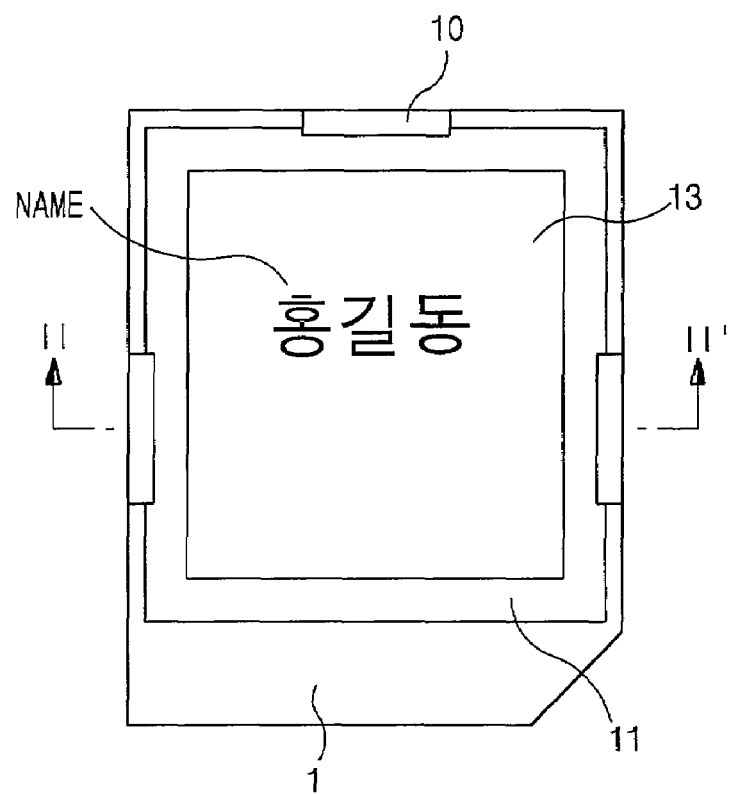
FIG. 7 is a plan view of a SIM card embodying the invention having a user verification means thereon.
Figure 8:
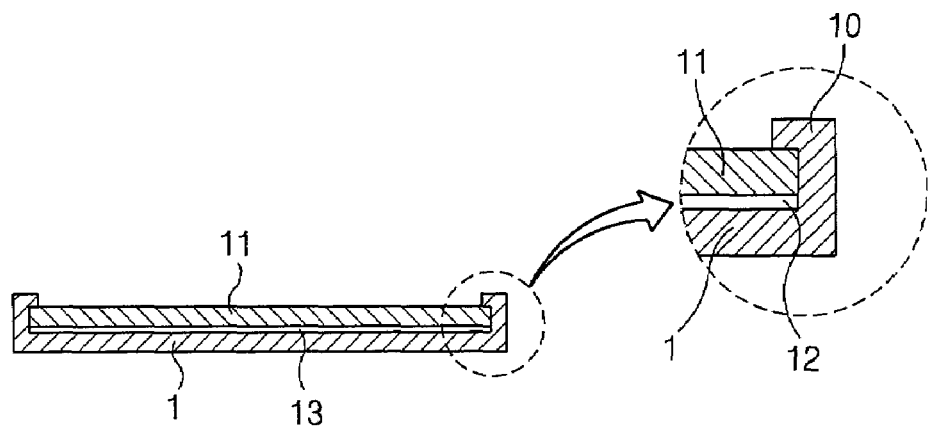
FIG. 8 is a sectional view taken along section line II-II in FIG. 7.
Figure 9:
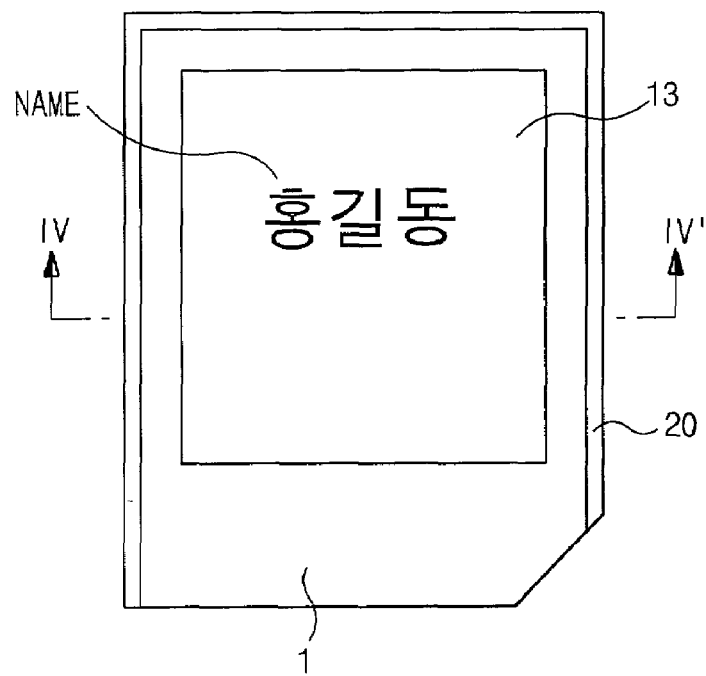
FIG. 9 is a plan view showing another embodiment of a SIM card having a user verification means thereon.
Figure 10:
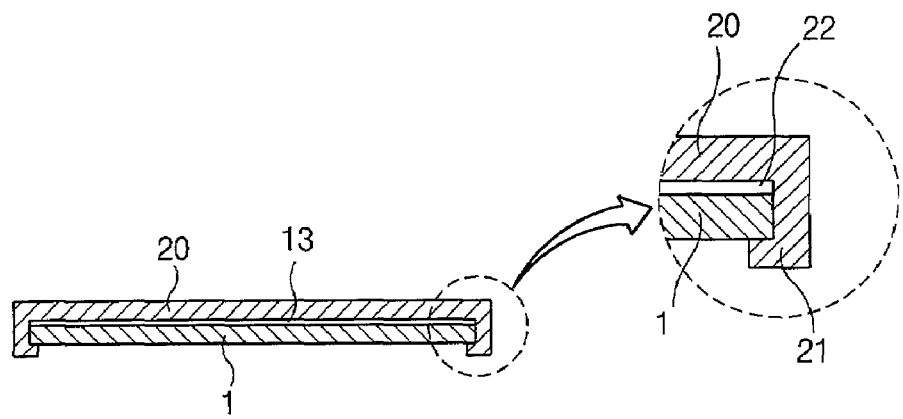
FIG. 10 is a cross-sectional view taken along section line IV-IV in FIG. 9.

FIGS. 7 and 9 are plan views showing embodiments of a SIM card in accordance with the present invention. FIGS. 8 and 10 are sectional views taken along section lines II-II and IV-IV of FIGS. 7 and 9, respectively.

As shown in FIGS. 7 and 8, in one embodiment of the invention, one or more concave fixing pieces 10 are attached around side surfaces of a SIM card 1. A transparent plate 11 is then held against the SIM card 1 by the concave fixing pieces 10. Photographs, tags or labels 13 can be mounted in the slot 12 between the SIM card 1 and the transparent window 11.

In another embodiment, as shown in FIGS. 9 and 10, a transparent cover 20 is mounted on a SIM card 1. The transparent cover includes a groove part 21 on side edges of the transparent cover 20 to hold the transparent cover on the SIM card 1. The groove part 21 can be formed as a continuous groove, or the groove part 21 can be formed on the transparent cover 20 at intervals. A SIM card 1 is then slidably inserted into the transparent cover. Photographs, tag or labels 13 can be inserted into the slot 22 formed between the SIM card 1 and the transparent cover 20. In preferred embodiments of the invention, the groove part 21 is formed on three side surfaces of the transparent cover 20.

The embodiments of the present invention shown in FIGS. 7-10 allow a user to attach a photograph or name tag on a surface of the SIM card using adhesive or double-faced tape. This allows the user to visually identify his SIM card from the SIM cards belonging to other users. Also, it allows a user to verify the identity of a SIM card without positioning the SIM card in the terminal. Even when the SIM card is mounted in the terminal, a transparent window in the terminal would still allow the user to check the SIM card to determine if it is his own.

As described above, in some embodiments of the invention, the user can visually verify the SIM card owner by displaying image data on a display screen of a terminal, and/or by playing audio data over a speaker when power is first applied. In other embodiments of the invention, the user can easily verify the owner of a SIM card based on a photograph or name tag attached to the SIM card, without the need to insert the SIM card into a terminal. When a SIM card bears some identifying material, a communications terminal embodying the invention would include a transparent window that allows a user to see the identifying material, even when the SIM card is mounted within the communications terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile communications terminal, comprising:
    a Subscriber Identity Module (SIM) card reader configured to read at least one of image data or audio data from a SIM card; and
    a display screen, wherein the communications terminal is configured to ask a user whether to display image data read from the SIM card, and to display the image data read from the SIM card on the display screen when power is first applied to the communications terminal.

2. The mobile communications terminal of claim 1, further comprising a speaker, wherein the SIM card reader is further configured to read audio data from the SIM card when power is first applied to the communications terminal, and wherein the communications terminal is configured to play the audio data read from the SIM card over the speaker of the communications terminal.

3. The mobile communications terminal of claim 1, further comprising a SIM card, wherein the SIM card comprises:
    a memory chip configured to store at least one of image data or audio data; and
    a microprocessor configured to write image data to the memory chip, and to read image data from the memory chip.

4. The mobile communications terminal of claim 3, wherein the microprocessor is also configured to write audio data to the memory chip, and to read audio data from the memory chip.

5. The mobile communications teriminal of claim 3, wherein the memory chip comprises:
    a personal verification storage unit where personal information is stored;
    a registration data storage unit where data related to base station registration is stored; and
    an owner verification data storage unit where at least one of the SIM card owner's image data or the SIM card owner's audio data are stored.

6. A mobile communications terminal, comprising:
    a controlling unit for reading owner identification data from a Subscriber Identity Module (SIM) card when power is first applied to the communications terminal, wherein the SIM card comprises a memory chip and a microprocessor, the memory chip comprising:
        a personal verification storage area where personal verification information is stored;
        a registration data storage area where data related to base station registration is stored; and
        an owner identification data storage area where information identifying the SIM card owner is stored;
    an interface unit configured to interface the SIM card with the controlling unit; and
    a playing device configured to play back owner identification data read from the SIM card to a user when power is first applied to the communications terminal.

7. The mobile communications terminal of claim 6, wherein the controlling unit is configured to ask the user whether to display owner identification data read from the SIM card when power is first applied to the communications terminal.

8. The mobile communications terminal of claim 6, wherein the controlling unit is configured to read at least one of owner image data or owner audio data from the SIM card when power is first applied to the communications terminal.

9. The mobile communications terminal of claim 6, wherein the controlling unit is configured to read owner image data from the SIM card when power is first applied to the communications terminal, and wherein the playing device is configured to display the owner image data read from the SIM card.

10. The mobile communications terminal of claim 6, wherein the controlling unit is configured to read owner audio data from the SIM card when power is first applied to the communications terminal, and wherein the playing device is configured to play the owner audio data read from the SIM card.

11. A method for verifying a Subscriber Identity Module (SIM) card owner, comprising:
    storing owner identification data in a SIM card;
    mounting the SIM card in a communications terminal;
    reading the owner identification data from the SIM card when power is first applied to the communications terminal;
    displaying a selection message asking whether the owner identification data should be played when power is first applied to the communications terminal;
    reading a user response to the selection message; and
    playing the owner identification data read from the SIM card to a user when the user requests that the owner identification data be played.

12. The method of claim 11, wherein the storing step comprises storing owner image data in the SIM card, and wherein the playing step comprises displaying the owner image data on a display screen of the communications terminal.

13. The method of claim 11, wherein the storing step comprises storing owner audio data in the SIM card, and wherein the playing step comprises playing the owner audio data over a speaker of the communications terminal.

14. A Subscriber Identity Module (SIM) card holding unit, comprising:
    at least one concave fixing piece configured to be attached to a SIM card; and
    a transparent plate coupled to the at least one concave fixing piece, wherein when the concave fixing piece is attached to the SIM card, the transparent plate allows a user to view indicia attached to the SIM card.

15. The SIM card holding unit of claim 14, wherein when the concave fixing piece is attached to the SIM card, a slot is formed between the transparent plate and the SIM card, and wherein a label positioned in the slot can be viewed through the transparent plate.

16. A Subscriber Identity Module (SIM) card holding unit, comprising:
    a transparent cover member, comprising at least one groove portion configured to engage with an outer edge portion of a SIM card so as to slidably receive the SIM card, wherein when the SIM card is inserted into the at least one groove portion of the transparent cover member, indicia on the SIM card can be viewed through the transparent cover member.

17. The SIM card holding unit of claim 16, wherein when the SIM card is slidably inserted into the at least one groove member, a slot is formed between the SIM card and the transparent cover member, and wherein a label positioned in the slot can be viewed through the transparent cover member.

18. The SIM card holding unit of claim 16, wherein the at least one groove portion comprises a continuous groove formed as an extension from an outer edge surface of the transparent cover member.

19. The SIM card holding unit of claim 16, wherein the at least one groove portion comprises a series of groove portions formed at predetermined intervals along an outer edge surface of the transparent cover member.

20. The SIM card holding unit of claim 16, wherein the at least one groove portion comprises a first portion formed extending downward from an outer edge portion of the transparent cover member, and a second portion extending inward from an end of the first portion so as to form a slot configured to receive the SIM card, wherein the slot is configured to completely cover an upper surface of the SIM card and to leave a lower surface of the SIM card exposed.

21. A mobile communications terminal, comprising:
a Subscriber Identity Module (SIM) card, comprising:
a memory chip configured to store at least one of image data or audio data, wherein the memory chip comprises:
a personal verification storage unit where personal information is stored;
a registration data storage unit where data related to base station registration is stored; and
an owner verification data storage unit where at least one of the SIM card owner's image data or the SIM card owner's audio data are stored; and
a microprocessor configured to write image data to the memory chip, and to read image data from the memory chip;
a Subscriber Identity Module (SIM) card reader configured to read at least one of image data and audio data from the SIM card; and
a display screen, wherein the communications terminal is configured to display the image data read from the SIM card on the display screen when power is first applied to the communications terminal.

22. A mobile communications terminal, comprising:
a controlling unit for reading owner identification data from a Subscriber Identity Module (SIM) card when power is first applied to the communications terminal, wherein the controlling unit is configured to ask the user whether to display owner identification data read from the SIM card when power is first applied to the communications terminal;
an interface unit configured to interface the SIM card with the controlling unit; and
a playing device configured to play back owner identification data read from the SIM card to a user when power is first applied to the communications terminal.

23. A mobile communications terminal, comprising:
a Subscriber Identity Module (SIM) card reader configured to read image data from a SIM card;
a display screen; and
a SIM card, wherein the SIM card comprises:
a memory chip configured to store image data, wherein the memory chip comprises:
a personal verification storage area where personal information is stored;
a registration data storage area where data related to base station registration is stored; and
a verification data storage area where image data is stored; and
a microprocessor configured to write image data to the memory chip, and to read image data from the memory chip.

24. The mobile communications terminal of claim 23, wherein the communications terminal is configured to automatically display image data read from the SIM card when power is first applied to the communications terminal.

25. The mobile communications terminal as claimed in claim 23, wherein the image data stored in the verification data storage area is the SIM card owner's image data, and wherein the communications terminal is configured to ask whether to display image data read from the SIM card when power is first applied to the communications terminal.

* * * * *